Feb. 18, 1941.  W. E. HAUPT  2,232,454
AUTOMATIC POWER TRANSMITTING MECHANISM
Filed Feb. 14, 1933   4 Sheets-Sheet 1
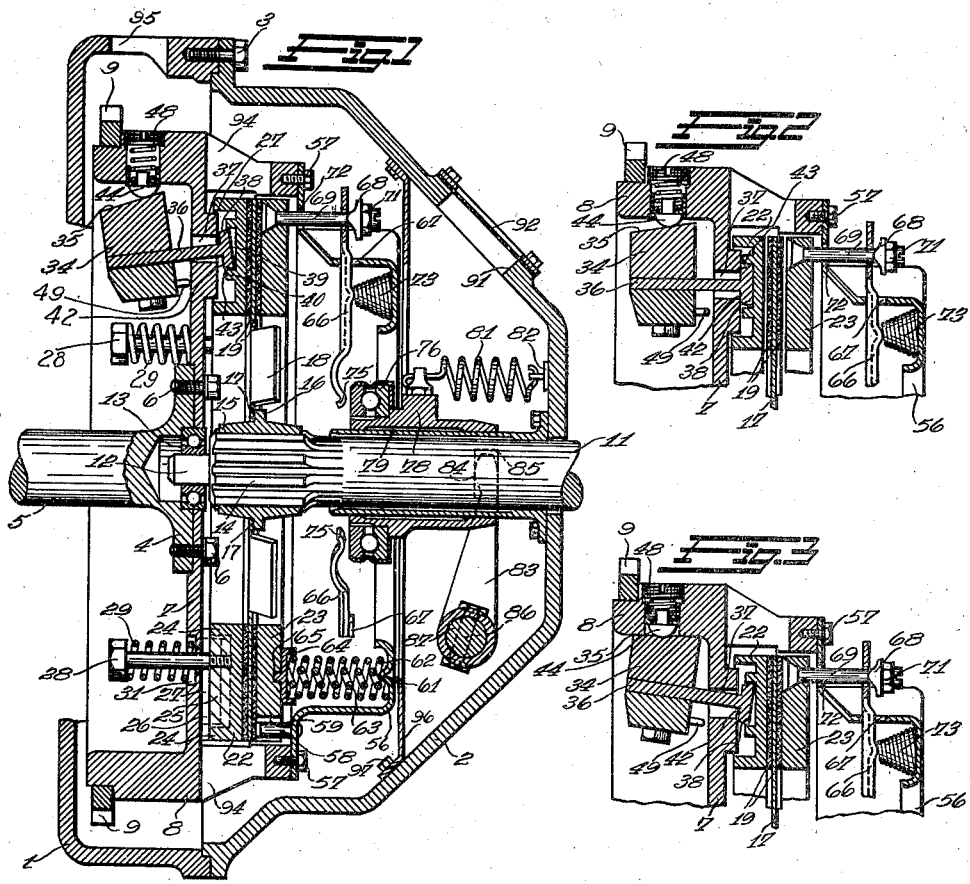
Inventor
William E. Haupt
Strauch & Hoffman
Attorneys

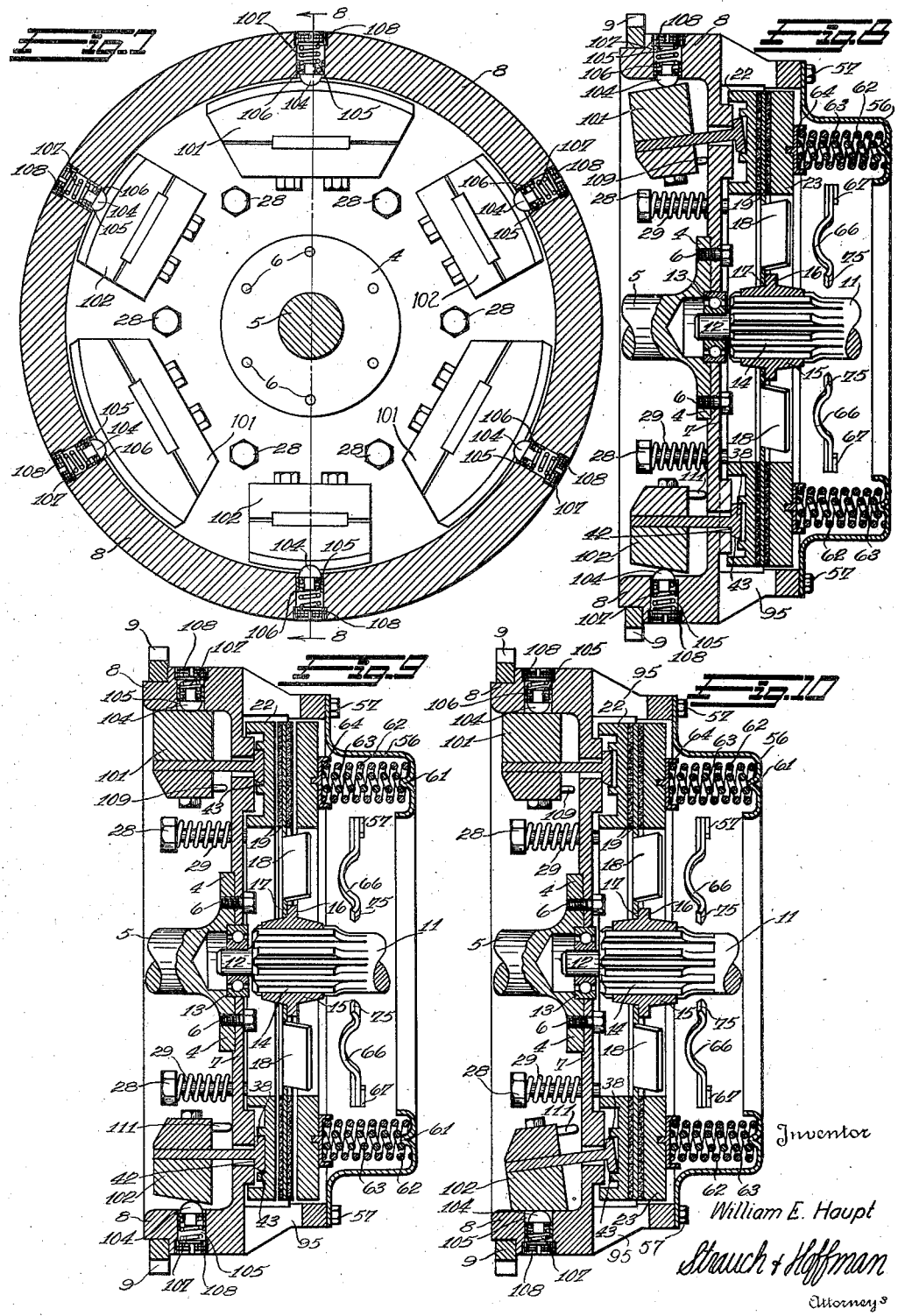

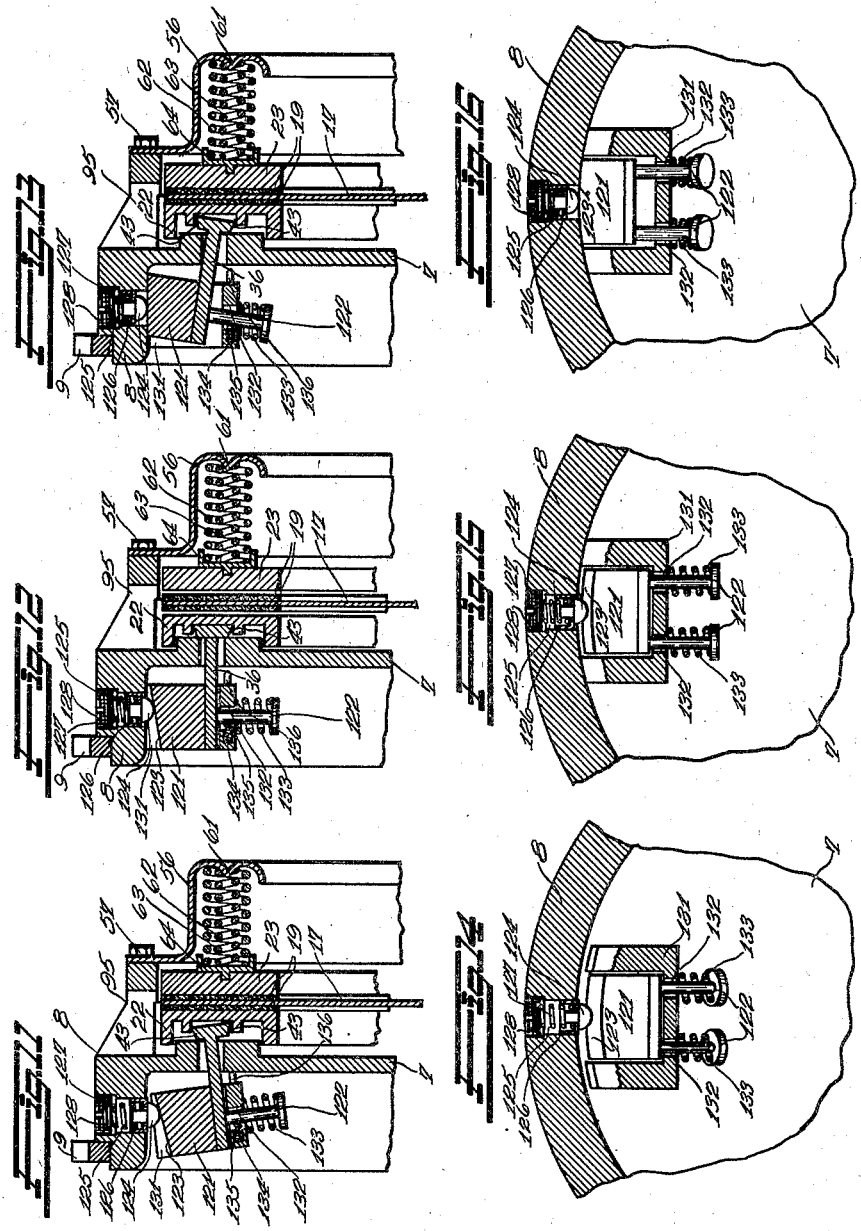

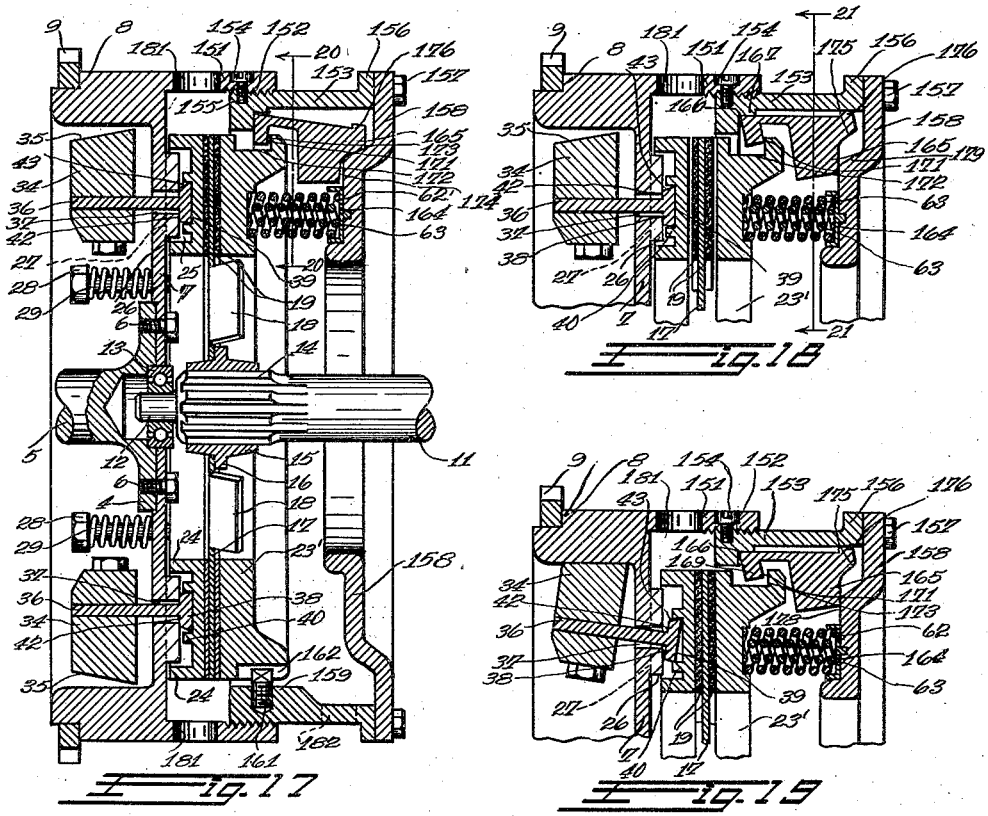

Patented Feb. 18, 1941

2,232,454

UNITED STATES PATENT OFFICE 2,232,454

AUTOMATIC POWER TRANSMITTING MECHANISM

William E. Haupt, Brooklawn, N. J., assignor to Automatic Drive & Transmission Company, Gloucester City, N. J., a corporation of New Jersey Application February 14, 1933, Serial No. 656,755

32 Claims. (Cl. 192—105)

The present invention relates to automatic mechanisms for establishing a power transmitting connection between a driving member and a driven member. More particularly the present invention relates to automatic or self-operated clutch mechanisms adapted for motor vehicle or similar drives.

In co-pending application Serial Number 595,184, filed February 25th, 1932, an automatic clutch mechanism is disclosed having a driven member which is disposed between an automatic plate and a positive plate, and the latter are carried and driven by a driving member that is adapted to be coupled to a prime mover. The positive plate is resiliently backed up by spring means, and is provided with release mechanism for causing movement thereof away from the driven member. The clutch mechanism is normally disengaged when the driving member is operating at speeds below a predetermined speed, and the automatic plate is automatically actuated in accordance with the speed of the driving member to clamp the driven member against the positive plate, and cause increasing pressure to be built up in the spring means, as the driving member is accelerated to the predetermined speed. A torque of increasing magnitude is accordingly transmitted from the driving member to the driven member, and when a still higher predetermined speed is attained, a positive friction coupling is established between the driving and driven members. Means are also associated with the release mechanism for automatically actuating it, when the speed of the driving member falls substantially below the predetermined idling speed or comes to rest, to allow the spring means to actuate the positive plate so as to clamp the driven member against the automatic plate, the latter being in its retracted position under these conditions. The driving and driven members are accordingly also automatically coupled together for power transmission under these conditions.

It is highly desirable that a clutch mechanism of this character automatically operates to establish a driving connection between the prime mover and the load when the engine is dead or at rest. For instance, in a motor vehicle provided with a clutch mechanism of this character, if the battery is weak and the engine is cold, the transmission may be placed in any gear desired, and the vehicle towed or coasted in order to turn the engine over for starting purposes in view of the fact that the clutch is automatically engaged under these conditions. Another instance where it is desirable to effect a direct drive between the driving and driven shafts is where a vehicle is stalled on a grade crossing or other dangerous location. In the event that the vehicle is provided with a clutch mechanism of the character just described, the vehicle transmission may be placed in low or reverse gear and the vehicle propelled away from such dangerous location by the starting motor, the clutch being automatically engaged under these conditions. This automatic operating characteristic is especially desirable in this latter instance because many vehicle operators would not have the presence of mind under such circumstances to operate a manual control member for engaging the clutch. Another instance where it is particularly desirable to automatically effect clutch engagement is when the engine stalls while the transmission is in gear and the vehicle is in motion. In this event, automatic engagement of the clutch mechanism in response to stalling of the engine automatically couples the engine with the rear wheels of the vehicle, and the momentum of the vehicle is accordingly available to be used to cause the engine to be turned over or cranked. Also, when the vehicle is parked on a steep grade, the transmission may be shifted into any gear desired to augment the action of the hand brake mechanism, in view of the fact that this operation couples the engine with the vehicle wheels.

The practical design, long operating life, smooth operating properties and fool-proof character of this clutch mechanism render it applicable to a wide variety of drives, and is especially adapted for use in automotive or similar drives where such units are required to have manifold operating capabilities, and yet to be simple in structure and free from the necessity of excessive manual operations. The present invention provides automatic power transmitting mechanisms having the desirable operating characteristics of the mechanism disclosed in the above mentioned application, and further highly desirable characteristics to be hereinafter pointed out, but are constructed, and automatically bring the clutch plates together in driving engagement, when the engine, or other prime mover, falls below a predetermined speed or is stationary, in a somewhat different manner.

It is a primary object of the present invention to provide novel automatic power transmitting mechanisms of the character mentioned having means associated with the driving member so that when the driving member operates below a predetermined speed, the driving and driven members are automatically coupled together.

Another object of my invention is to provide novel power transmitting mechanisms of the character mentioned wherein the driving and driven members are normally disconnected throughout a predetermined speed range of the driving member, and means are associated with the driving member for coupling the driving and driven members when the speed of the driving member rises above, or falls below the predetermined speed range.

A further object of the present invention is to provide novel automatic power transmitting mechanisms of the character mentioned wherein the driving member is automatically actuated to couple the driving and driven members when the speed of the driving member operates below a predetermined speed or is stationary, and to provide manually operable mechanism for uncoupling the driving and driven members under such conditions.

It is another object of the present invention to provide novel automatic power transmitting mechanisms of the character mentioned having an automatic plate that is actuated in such manner, that when the automatic plate is stationary or rotating below a predetermined speed, it is automatically coupled to the driven member, and when the automatic plate rotates above said predetermined speed it will be automatically uncoupled from the driven member, and when the automatic plate attains a higher predetermined speed it will again be coupled to the driven member.

A further object of my invention is to provide means for actuating the automatic plate of the automatic power transmitting mechanisms above referred to in such manner, that when the speed of the automatic plate exceeds a predetermined speed, it will be automtically coupled to the driven member, and to provide the automatic plate with further means for coupling the automatic plate and the driven member when the speed of the automatic plate falls below a predetermined value.

Still another object of the present invention is to provide automatic power transmitting mechanisms of the character mentioned with self-contained, speed responsive means for causing the positive plate to clamp the driven member between it and the automatic plate when the speed of the positive plate falls below a predetermined value, thus avoiding the necessity for external control mechanisms of any sort.

Another object of my invention is to provide novel automatic power transmitting mechanisms that are so designed, that when the particular drive in which they are employed is idle or not in use, the relatively thin driven member is automatically, firmly gripped between two rigid members providing plane surfaces, thereby effectively preventing the driven member from responding to any warping or distorting tendencies set up therein as the result of severe abuse in operation, and in fact tending to iron out any existing irregularities in the configuration thereof.

Another object of the present invention is to so design automatic power transmitting mechanisms having driving and driven members that are automatically coupled together when the driving member attains a predetermined speed, that the driving and driven members may be manually uncoupled with a minimum of effort during any phase of operation.

Additional objects of the present invention will become apparent as the following detailed description thereof proceeds and from the appended claims when taken in conjunction with the accompanying drawings.

In the drawings:

Figure 1 is a longitudinal sectional view of an automatic power transmitting mechanism forming part of the present invention illustrating the position the centrifugal mechanism takes when the flywheel is stationary, or is operating at speeds substantially below idling speeds, the plates being shown engaged.

Figure 2 is a sectional view of a portion of the mechanism disclosed in Figure 1, with the centrifugal mechanism disposed in the position it takes when the flywheel is operating substantially at idling speed, and the plates disengaged.

Figure 3 is a view similar to Figure 2, illustrating the centrifugal mechanism in the position it takes when the flywheel is operating at speeds substantially above idling speeds and the plates are in firm driving engagement.

Figure 4 is a fragmentary sectional view of part of the clutch mechanism illustrated in Figure 1 showing one of the centrifugal weights in the position it takes when the flywheel is stationary or operating at a speed substantially below idling speeds.

Figure 5 is a view similar to Figure 4 illustrating the centrifugal weight in the position that it takes when the flywheel is operating substantially at idling speed.

Figure 6 is a view similar to Figure 4 showing the centrifugal weight in contact with the flywheel web, corresponding to the conditions existing when the flywheel is operating at speeds substantially above idling speeds.

Figure 6A is a sectional fragmental view of the mechanism of Figure 1 provided with stop means for relieving the throwout bearing of load at all times except when the mechanism is manually declutched.

Figure 6B is a fragmentary sectional view illustrating my novel centrifugal mechanism incorporated in a slightly different type of automatic power transmitting mechanism.

Figure 7 is a view of the mechanism illustrated in Figure 1, having a modified form of centrifugal mechanism associated therewith, and the flywheel rim is shown in section to more clearly illustrate the structure involved.

Figure 8 is a view taken approximately on the line 8—8 of Figure 7, looking in the direction of the arrows, showing the centrifugal weights in the positions that they assume when the flywheel is operating at speeds substantially below idling speed, or is stationary, the plates being shown in driving engagement.

Figure 9 is a view similar to Figure 8, illustrating the centrifugal weights in the positions they assume when the flywheel is operating substantially at idling speed.

Figure 10 is a view similar to Figure 8 illustrating the centrifugal weights in the positions they assume when the flywheel is operating at speeds substantially above idling speed.

Figure 11 is a view illustrating the mechanism of Figure 1 provided with a further modified centrifugal mechanism, and the parts are illustrated in the positions they take when the flywheel is stationary or rotating at a speed substantially below idling speed, and the plates are engaged.

Figure 12 is a view similar to Figure 11, and illustrates the parts in the positions they assume when the flywheel is rotating substantially at idling speed, and the plates are engaged.

Figure 13 is a view similar to Figures 11 and 12 and shows the centrifugal mechanism in the position it assumes when the flywheel is rotating substantially above engine idling speed.

Figures 14, 15 and 16 are views with parts in section and illustrate the mechanisms shown in Figures 11, 12 and 13 as they appear when viewed from the left-hand sides of these figures respectively.

Figure 17 is a longitudinal sectional view of a modified form of clutch mechanism wherein centrifugal means are associated with the positive plate for bringing the plates into engagement when the flywheel is stationary or operating below a predetermined speed, and the parts are shown as they appear when this speed prevails.

Figure 18 is a fragmentary sectional view of the clutch mechanism illustrated in Figure 17, with the parts thereof in the position they assume when the flywheel is operating at idling speeds.

Figure 19 is a view similar to Figure 18, illustrating the parts disposed in the positions they assume when the flywheel is operating at speeds substantially above idling speeds, and with the plates in full driving engagement.

Figure 20 is a view taken substantially on the line 20—20 of Figure 17, when looking in the direction of the arrows.

Figure 21 is a view taken substantially on the line 21—21 of Figure 18, when looking in the direction of the arrows.

With continued reference to the drawings wherein like reference characters designate like parts throughout the several views thereof, a bell housing 1, having a cover or complemental housing member 2 secured thereto by machine screws 3 or the like, encloses the clutch mechanism, and they will both be referred to hereinafter as the clutch housing. Secured to flange 4 of engine or driving shaft 5, by means of bolts 6 or the like, is the web portion 7 of flywheel 8. Flywheel 8 is provided on its periphery with the usual starting gear 9.

Disposed in axial alignment with shaft 5 and mounted for rotation is driven shaft 11 which is reduced at 12 at one end and journaled in a suitable pilot bearing assembly 13. Shaft 11 is adapted to have the other end thereof operably connected to a suitable gear changing apparatus for amplifying the torque applied to the final driven member. Driven shaft 11 has a splined portion 14 on which a correspondingly splined hub 15 is slidably mounted. Hub 15 is provided with a flange 16 to which is suitably secured by welding, riveting or the like, a relatively thin metal disk 17, which constitutes the driven clutch disk or member. Disk 17 has blades 18 struck out of the body thereof adjacent its junction with flange 16. Each blade 18, as shown in the drawings, is so disposed, that when shaft 11 rotates, a current of air is drawn into the center of the clutch and forced outwardly over the clutch parts for a purpose that will more fully appear hereinafter. Each face of disk 17, near the periphery thereof, is provided with a facing 19, which may consist of any material that has the required characteristics to give the correct frictional gripping force and at the same time has wearing qualities adapting it for this purpose. I prefer, however, to use the lubricated type of material which has proven very satisfactory in mechanisms of the "Powerflo" type.

Frictional facings 19 may be secured to disk 17 in any suitable manner, for instance, by means of rivets or the like. Facings 19 cooperate with a pair of annular plates for effecting a driving connection between the driving shaft 4 and the driven shaft 11. Plate 22, which is adapted to cooperate with one facing 19, I term the automatic driving plate, and plate 23, which is adapted to engage the other facing 19, is termed the positive driving plate.

Plate 22 has a pair of annular strengthening ribs 24 formed on one face thereof, which give the plate rigidity and prevent distortion or warpage thereof. Integral radial keys 25 are formed on the face of plate 22, and are integral at their ends with ribs 24. The flywheel web is provided with an annular boss 26, having radial slots 27 formed therein which slidably receive keys 25. The walls of slots 27 form driving faces for engaging keys 25 to cause plate 22 to be driven by the flywheel. Each key 25 is bored to receive a threaded bolt 28. Disposed about each bolt 28, and having one end thereof bearing against the bolt head is a compression spring 29. The other end of spring 29 rests in a recess 31, formed in the flywheel web. While it is not absolutely essential, it is preferable, to provide plate 22 with as many hold-back bolts as there are keys, in order that a uniform hold-back pressure may be exerted upon the automatic plate.

Springs 29 are relatively weak, and their major function is to maintain automatic plate 22 in contact with the centrifugal weights, to be described hereinafter, at all times, thus insuring complete disengagement of the driving and driven plates when the engine or other prime mover is operating at idling speed, and they therefore may be termed idle clearance springs.

Plate 22 is caused to move away from the flywheel web against the action of idle clearance springs 29 for clutching purposes by means of a mechanism responsive to the speed of the flywheel, which in the present instance takes the form of centrifugally operable mechanism. Centrifugal weights 34 are associated with the flywheel and are preferably of the same number as hold-back bolts 28. Each weight 34 is provided with an inclined face 35 which is adapted to contact with the inner wall of the flywheel rim when it is in its extreme outward position. The weights are further provided with elongated rectangular lever sections 36 of substantial width, which extend through slots 37 in the flywheel web. Lever sections 36 are provided with heads 38. Each head is provided with a flat face 39 that is adapted to abut the face of plate 22. The face of plate 22, in combination with spaced, chordal ribs 40, formed thereon, forms a plurality of elongated bearing recesses. Heads 38 seat in these recesses and are also provided with faces 42 which are adapted to abut the flywheel web, and which are designed for sliding engagement therewith during their operation. Heads 38 have their opposite sides relieved to provide knife-like edges 43, which are adapted to fulcrum and seat in the dihedral angles defined by the face of plate 22 and ribs 40.

Referring to Figure 1, weight 34 is shown disposed in its innermost position, and fulcrum 43 of weight 34 has urged automatic plate 22 away from the flywheel against the action of hold-back spring 39. Weights 34 are urged into this position by means of plungers 44, which are adapted to contact faces 35. Referring more particularly to Figure 4, each plunger 44 is adapted to slide in a bore 45 in the flywheel rim, and has a cylindrical member 46 associated therewith. Member 46 forms a seat for a compression spring 47, and also serves to guide plunger 44 in its movement. Springs 47 are held in place under compression, by means of plugs 48 tapped or otherwise suitably secured in bores 45. In order to prevent plungers 44 from urging weights 34 inwardly beyond a predetermined position, stops 49 are provided on the inner face of weights 34, and cooperate with the flywheel web to limit inward movement of them. The spring units, that have just been described, are so designed that they will hold weights 34 inward against the action of centrifugal force with their stops 49 in contact with the flywheel web until the flywheel attains a predetermined speed, which is approximately the idling speed of the prime mover employed. These spring units are therefore preferably termed initial or primary hold-back units.

By the term "idling speed" or "engine idling speed," I mean the normal idling speed of internal combustion engines employed in motor vehicles, but it is to be understood that these terms are intended to embrace any predetermined driving shaft speed at which it is desired to have the mechanism uncouple the driving and driven shafts, and this speed will obviously vary in practice, and will depend upon the characteristics of the particular drive involved.

Also cooperating with weights 34 are plungers 51, having flanges 52 formed thereon, which cooperate with the bottom of a recess 53 formed in the flywheel rim to limit downward movement thereof. Plungers 51 are urged toward the bottom of recesses 53 by means of compression springs 54, which are held in place by plugs 55 tapped into bores 53. These units are preferably termed secondary or final hold-back units and their operation will be described hereinafter.

The mechanism associated with positive plate 23 will now be described. A combined housing and reaction member 56 which may be called a cover plate, is secured to the flywheel by a plurality of cap screws 57, which are threaded into the flywheel. Positive plate 23 is keyed to housing 56 by means of studs 58, which pass through apertures in housing 56 and are swaged over. Slots 59 formed in the periphery of positive plate 23, form driving faces and slidably receive studs 58. As seen in the lower part of Figure 1, housing 56 is provided with retainers 61 which are preferably struck from the body thereof, and against which are seated compression springs 62 and 63. Springs 62 and 63, at their other ends bear against, and are seated in retainers 64, which have projections 65 seating in sockets formed in the rear face of positive plate 23. Springs 62 and 63 urge positive plate 23 against automatic plate 22 and member 17 when the parts are in the positions shown in Figures 1 and 3. Springs 62 are so designed and arranged, that when the parts are in the positions shown in Figure 2, they are under considerable compression, while springs 63, which are stiffer than springs 62, are merely loosely disposed in their sockets and therefore do not act upon plate 23.

Positive plate 23 is adapted to be moved away from the other clutch member against the action of springs 62 and 63 by means of a plurality of clutch fingers 66, which are fulcrumed in apertures 67 formed in housing 56. The outer ends of fingers 66 cooperate with fulcrum members 68 which are adjustably held on studs 69 by means of lock-nuts 71. Studs 69 extend through apertures 72 formed in housing 56 and are rigidly secured to plate 23 in any suitable manner. Each finger 66 is acted upon by a compression spring 73, seating against housing 56. The purpose of springs 73 is to hold the levers against their fulcrums at all times, and to prevent them from vibrating when they are not actually under stress of the throwout mechanism. By rotating nuts 71, the relation between studs 69 and fingers 66 may be adjusted, and accordingly the relation of the fingers to positive plate 23 may be varied. The clutch is initially adjusted at the factory by properly rotating nuts 71 to establish parallelism of plates 23 and 22, and it is contemplated that all service adjustments thereafter for plate wear be made externally of the mechanism in the manner to be presently described.

Clutch fingers 66 are provided with curved faces 75, which cooperate with a bearing assembly 76, mounted on a sleeve member 78, which in turn is slidably mounted on a stationary hollow supporting member 79, secured to housing member 2, and through which driven shaft 11 extends. Sleeve member 78 is urged to the right to retracted position by means of a tension spring 81 secured thereto, and to a suitable support 82, mounted on housing 2. Sleeve member 78 is caused to move toward the clutch fingers 66, against the action of spring 81, by means of a forked lever 83. Lever 83 has curved extremities 84 which are adapted to cooperate with bosses 85 formed on sleeve 78. The inner sides of extremities 84 engage flat portions on each side of sleeve 78 and cooperate therewith to prevent rotation of sleeve 78 about support 79. Lever 83 is secured by means of pins 86 or the like, to a shaft 87, upon which is mounted, exteriorly of the clutch housing, a conventional clutch pedal (not shown) for imparting rotation to shaft 87 in well known manner. The clutch pedal may be provided with an adjustable stop so that its retracted position may be accurately controlled. Adjustment of the retracted position of the clutch pedal accordingly effects the limit of movement of the throwout bearing assembly and in turn the inner ends of levers 66 to the right, and therefore position of positive plate 23 may accordingly be adjusted exteriorly of the clutch housing to obtain correct idle clearance of the plates. It is to be understood, however, that if desired, individual adjustable stops for levers 66 may be mounted on cover plate 56, or direct acting stops may be disposed between the position plate and flywheel 8.

The operation of the clutch mechanism so far developed will now be described. When the driving shaft 5 is stationary, or operating below a predetermined speed, (engine idling speed if the mechanism is installed in a motor vehicle or the like), the parts will appear in the positions in which they are disposed in Figure 1. In this figure weights 34 are held in their innermost positions under the influence of plungers 44, and the outer reaction faces 42 and inner knife edges 43 of weight heads 38 cooperate with the flywheel web and the automatic plate respectively and accordingly cause the automatic plate to frictionally clamp driven member 17 between it and positive plate 23, thereby coupling shafts 5 and 11. In this figure it will be observed that due to the position taken by the positive plate in response to movement of the automatic plate, all stress has been taken off levers 66, and they are accordingly disposed in spaced relation to bearing assembly 76.

A driving connection now exists between driving shaft 5 and driven shaft 11 and if the mechanism is installed in a motor vehicle having a conventional transmission, the transmission may be placed in gear and the vehicle coasted or towed, in order to turn the engine over for starting purposes. In the event the vehicle is in a dangerous position, and the engine is stalled, the transmission may be placed in low gear and the vehicle propelled through the power of the starting motor (not shown) cooperating with gear 9, or the transmission may be placed in low or reverse gear for providing an auxiliary brake for holding the vehicle when the latter is parked on a steep grade.

When the speed of driving shaft 5 attains a predetermined value, weights 34 move outwardly in response to centrifugal force and overcome the resistance of the initial hold-back spring units. So long as this speed is maintained, the parts take the positions shown in Figure 2, with weights 34 in contact with plungers 51. This operation brings flat face 39 of weight heads 38 into engagement with automatic plate 22, and allows retraction of automatic plate 22 towards the flywheel web, under the influence of idle clearance springs 29. Automatic plate 22 is accordingly caused to move into the idle clearance position shown in Figure 2, under the influence of the idle clearance springs 29, and the clutch plates are disengaged. Driving shaft 5 and driven shaft 11 are now disconnected. Positive plate 23 is held in the position shown in Figure 2 against the action of springs 62 by any of the mechanism previously described.

It is to be understood, that if desired, plungers 51 may be dispensed with, and plungers 44 designed to stop the weights when they reach their neutral positions where the flywheel attains engine idling speed. However, it is preferable to employ plungers 51 in combination with plungers 44 for the reason that the springs associated with plungers 51, are pre-loaded, and cause plungers 51 to offer substantial resistance to further movements of weights 34, when they are contacted by them. Plungers 51 thereby stabilize weights 34 and tend to cause them to remain in neutral position while the engine is operating in the idling speed range, and also sufficiently in excess thereof so as to avoid premature or irregular clutch engagement. On the other hand, if a delicate balance of centrifugal force against spring force existed, and inadvertent slight acceleration of the engine might cause clutch engagement at the time when clutch engagement would be undesirable. However, with the present mechanism the automatic plate is maintained in disengaged position so long as the engine is operating substantially at idling speed, and a thoroughly practical power transmitting mechanism is accordingly produced.

When it is desired to automatically couple the driving and driven shafts, the driving shaft is accelerated above the predetermined idling speed. As the flywheel is accelerated, weights 34 gradually swing outwardly and pivot about their outer knife edges 43, and their inner fulcrum faces 42 react against the flywheel web to force automatic plate 22 away from the flywheel against the action of springs 29, and the combined retarding influences of plungers 44 and 51. Due to the resisting action of these springs, movement of the weights is smooth and there is no tendency for them to vibrate or undergo other undesirable movements. When the speed is sufficiently great, automatic plate 22 engages facing 19 of driven member 17, causing driven member 17 to slide longitudinally on shaft 11. Facing 19 of clutch member 17 is then brought into contact with positive plate 23. As the weights 34 swing further outwardly, pressure is built up in springs 62. Since springs 63 are only loosely disposed in their sockets, they do not oppose or retard movement of the positive plate at this time. Springs 62 are accordingly undergoing compression as they resist the movement of plate 23, and a torque of low, and slowly increasing magnitude is initially transmitted to the driven shaft 11. As springs 62 are further compressed, the magnitude of the torque transmitted is gradually increased and shaft 11 is picked up evenly and without grabbing with a slipping drive. When positive plate 23 has been moved sufficiently under the influence of weights 34, it contacts secondary springs 63, and at this time the first stage of clutch engagement operation may be said to be at an end, and the second stage initiated.

Further movement of the plates under the influence of weights 34 causes pressure to build up between them at a relatively rapid rate, since movement of the positive plate 23 is now resisted by the combined action of springs 62 and 63. When weights 34 contact the flywheel rim, the plate pressure has built up sufficiently to establish a positive drive between the driving and driven members, and there is then no slippage between the driving and driven shafts. In the first stage, reaction of movement of the plates is provided by springs 62, and in the second stage this reaction is augmented by springs 63. In actual practice these stages may be designed to merge into each other so completely that the change from one to the other is imperceptible, and a very smooth clutch engagement accordingly is obtained. When it is desired to disengage the clutch mechanism, the flywheel is decelerated, and when the predetermined idling speed is reached, springs 29 and plungers 44 and 51 move weights 34 into their neutral positions and cause disengagement of the clutch plates.

In the event that this mechanism is installed in a motor vehicle, and the plates have been moved into full driving engagement and it is desired to decelerate or stop the vehicle, the accelerator is released and the brakes applied. When the vehicle has decelerated to a speed corresponding substantially to engine idling speed, through the combined braking action of the engine and the brake mechanism, weights 34 operate and relieve the clutch plates of driving pressures. The parts then take the positions shown in Figure 2. The vehicle may be brought to a complete stop by continued application of the brakes, or if traffic conditions permit the accelerator may be depressed and the engine speed accelerated to cause almost immediate reengagement of the clutch and the vehicle is again picked up in high gear. When operating in high gear, or any other gear for that matter, and a grade is encountered that requires more torque than the engine can deliver in that particular gear at that particular speed, the engine will naturally decelerate under such excess load, and when sufficiently decelerated, weights 34 permit slippage between the clutch plates. Since it is an inherent characteristic of an internal combustion engine to deliver more torque when the speed thereof is increased up to its peak of torque output, the engine, due to slipping conditions existing at this time, will be accelerated sufficiently so as to develop sufficient torque to carry the vehicle over the grade, thus doing away with the necessity of shifting the transmission to a lower gear.

It is to be understood, however, that if the grade requires substantially more torque than the engine can deliver at that particular speed and in the particular gear, the transmission must be shifted to secure a torque multiplication, because the present mechanism does not function as a torque multiplier, but merely permits the engine, under certain conditions, to accelerate and operate on a more effective point on its speed-torque curve.

As the vehicle gains speed up the grade, or again reaches substantially level ground, weights 34 will again exert sufficient pressure on the automatic plate to again establish a non-slipping drive between the clutch plates. This mode of operation is made possible by the lubricated character of the facing material that is employed in the present clutch mechanism, in combination with the ventilating and dust removing provisions that are incorporated therein which will be presently described.

When the automatic plate, in response to the centrifugal weights, has moved to engaged position against the action of its springs 29, the positive plate may be moved away from the driven member by manual depression of the clutch pedal, thereby disconnecting the driven and driving shafts. In traffic, when it is desired to get the vehicle away quickly, and in starting up grades, the clutch pedal may be operated in this manner to disengage the clutch between each gear shifting operation as in the manner practiced in a vehicle of the type provided with a conventional manually operable clutch. However, it is contemplated to start the vehicle in high gear under normal operating conditions with the present clutch mechanism.

When the engine is stopped and the flywheel is stationary weights 34 assume the positions shown in Figure 1 of the drawings, and acting through their inner knife edges 43, cause actuation of the automatic plate to effect a direct drive from the driving to the driven shaft in the manner previously described. When the parts are in this position, and it is desired to disconnect the driving and driven shafts, the clutch pedal may be depressed to move positive plate 23 out of frictional engagement with the driven member. During this declutching operation, automatic plate 22 remains in its driving position, since it is urged toward the flywheel by means of release springs 29, and the automatic weights are unable to produce further movement of the automatic plate because they are restrained from further inward movement by means of their stops 49. Therefore, when the vehicle is not in use, the driven member is firmly clamped between the automatic and positive plates, unless the clutch pedal is operated to separate them, and since the automatic and positive plates are comparatively rigid, any warping or distorting tendencies of the relatively thin driven member will be inhibited, and in fact any irregularities in the driven member will tend to be ironed out under these conditions.

In the only types of slipping clutches that have been commercially successful, the clutch facings have been constructed of a special lubricated material having low coefficients of friction under low pressure, which gradually rise as the engaging pressures are increased, until when full torque is being transmitted and no slippage exists, the coefficient of friction is fairly high. However, even at the upper limits, the coefficients are substantially below those of the clutch facings employed in conventional manually operable clutches, thus requiring the use of heavier pressure driving springs for backing the positive plate to produce the proper frictional grip to secure non-slipping drive. The small available range of automatic movement of the clutch plates between their fully engaged and disengaged positions, together with the necessary limitations of maximum pressures to permit convenient manual declutching of a practical automatic automotive clutch, limits the available spring pressure differences between disengaged and fully engaged positions to a comparatively narrow range. In the mechanism disclosed in the manual co-pending application previously referred to, the positive plate has a relatively large range of movement because it is required to move in one direction to a position to effect manual declutching when the automatic plate is disposed in engaged position, and in another direction to effect clutch engagement when the automatic plate is in its retracted position. This requires three positions of the clutch pedal—positive, automatic and released, and the total movement of the positive plate must accordingly be relatively great. This requires less leverage on the clutch pedal mechanism so as to increase plate travel and as relatively heavy driving springs are used to back up the positive plate, it is necessary to exert quite a large pressure on the clutch pedal to manually declutch the mechanism. In the present mechanism, the only travel that the positive plate must undergo, is from the "automatic" or disengaged position shown in Figure 2, to manually disengaged position, and the clutch pedal accordingly need have only two positions, engaged and disengaged. Therefore, the clutch pedal leverage can be greater and less foot pressure required to lift the positive plate into release position.

Since slippage is inherent in the operation of a clutch of this type, heat is generated in the clutch parts and solid lubricant is freed from the facings during operation thereof. The heat and freed material should be eliminated, and to this end means are provided for ventilating and cooling the clutch by an air stream. The air stream abstracts heat from the clutch parts by convection and carries away the freed facing material therewith. Clutch housing 2 is provided with an aperture 91, in which is mounted a suitable screen 92 to prevent extraneous matter carried by the air from being introduced into the clutch mechanism. The air stream induced by the action of fan blades 18 and the centrifugal pumping action of apertures 94 in the flywheel, is drawn through screen 92 and along shaft 11 into the mechanism. A portion of the air stream, when the plates are disengaged, passes between the facings 19 and plate 23, and between the rear face of plate 23 and cover 56. Another portion of the air stream passes through the openings in driven member 17, provided by fan blades 18, and between facing 19 and plate 22, removing dust and solid freed lubricant in this region. An air stream also passes between automatic plate 22 and the flywheel web 7. The air passes over the facings and is heated, and the heated air and entrained dust is exhausted from the clutch structure into the clutch housing by means of apertures 94 formed in the flywheel rim.

While the heated, dust-laden air may be withdrawn or exhausted from the clutch housing in any suitable manner, I prefer to provide a suitable aperture 95 therein and associated valves of the type disclosed in copending application Serial Number 606,238, filed April 19th, 1932, now matured as U. S. Patent No. 2,107,954 to Morton, et al. therewith for controlling air flow from the clutch housing since it is desirable to control the dissipation of heat from the clutch parts. Due to the fact that the frictional coefficients of the facings employed decrease as the temperature thereof increases, by controlling the temperature properly, the clutch operating characteristics may be varied or controlled at will.

In order to prevent the heated, dust-laden air exhausted from apertures 94 in the flywheel rim from short-circuiting or re-entering the clutch mechanism, and for more efficiently producing a partial vacuum in the chamber disposed to the right of the clutch mechanism shown in Figure 1, I have provided an annular baffle member 96, which is preferably made of sheet metal, and is secured to the inner walls of the clutch housing by means of cap screws 97 or the like. Baffle member 96 has the inner periphery thereof disposed closely adjacent to the smooth outer face of cover 56, and cooperates therewith to prevent any substantial flow of air therebetween.

Referring to Figure 6A of the drawings, the mechanism just described is disclosed as having stop mechanism for the throwout levers, which is carried by the clutch mechanism itself. Clutch cover 56' is substantially like cover 56 shown in Figure 1, but is provided with a flat portion adjacent each stud 69', against which stop members 70 are adapted to seat. Studs 69' are threaded substantially throughout their length, and stop members 70 are adjustably threaded thereon and are secured in adjusted position by locknuts 70' or the like. When the mechanism is assembled, stop members 70 are adjusted to hold plate 23 in the position shown in Figures 2 and 6A against the action of springs 62. When facings 19 become thin as the result of wear, stop members 70 may also be adjusted to establish the proper clearance between the plates. In this mechanism, the entire force exerted by springs upon plate 23, under the conditions that exist when the flywheel is operating substantially at idling speed and the automatic plate is retracted, is transmitted through studs 69', to stops 70, and thence to cover 56'. Therefore, no stress is placed upon levers 66, and their inner ends may accordingly be designed to be spaced from bearing assembly 76 under these conditions. In view of the fact that the inner ends of levers 66 do not contact bearing assembly 76 when the flywheel is operating at idling speed, and do not apply pressure to it when the flywheel is rotating substantially above or below idling speeds, the bearing assembly is only called upon to operate when the mechanism is manually declutched and therefore has a long life.

After an adjustment of stop members 70, to compensate for wear of facings 19, has been completed, it may be found necessary to adjust fulcrums 68 to establish a clearance between the inner ends of levers 66 and bearing assembly 76. If desired, however, fulcrums 68 may be allowed to remain undisturbed, and the conventional stop associated with the clutch pedal adjusted to allow the bearing assembly to be retracted sufficiently to the right, under the influence of spring 81, to clear the inner ends of levers 66, when the automatic plate is disposed in the retracted condition illustrated in Figure 2. The operation of this mechanism is otherwise the same as that described in connection with Figures 1 to 6.

Referring now to Figure 6B of the drawings, I have illustrated my invention applied to the power transmitting mechanism shown in application Serial Number 634,047, filed September 20th, 1932, now matured as U. S. Patent No. 2,171,833 to Lewis which may be referred to for a full description of the structure involved. With continued reference to this figure, driven member 17, carrying facings 19, is disposed between a flywheel 8', and an automatic plate 22'. Automatic driving plate 22' and a reaction plate 23' are urged toward each other by spring means (not shown) and are both carried and driven by the flywheel. Automatic weight levers 36 extend through apertures in reaction plate 23' and the weights seat in and cooperate with elongated bearing recesses 40' formed in the automatic plate in the manner set forth in connection with the mechanism just described, to cause separation of plates 22' and 23' and accordingly cause the driven member to be gripped between automatic plate 22' and the flywheel under the proper speed conditions.

Plate 23' is resiliently backed by spring means (not shown), so that when plates 22' and 17 are brought into engagement, the reaction of weights 34 against reaction plate 23' will be resiliently taken thereby. Reaction plate 23' is further provided with a flange 41', in which plungers 44 and 51 are mounted in a manner similar to that shown in Figure 4. Weights 34 cooperate with plungers 44 and 51 to produce separation and engagement of the clutch plates in precisely the same manner as in those employed in the mechanism shown in Figures 1 to 6 of the drawings, and therefore the description of these operations will not be repeated. Reaction plate 23' may also be provided with means for manually moving it and automatic plate 22' connected thereto, away from the driven member for declutching purposes.

In connection with this device, it is to be understood that if desired a stop mechanism may be associated with reaction plate 23' for effecting the result accomplished by stop members 70 employed in the device illustrated in Figure 6A. The stop mechanism in the present instance, however, would be associated with the reaction plate and the flywheel, and would be designed to maintain the automatic driving plate out of contact with the driven member when the automatic plate is retracted with respect to plate 23'.

Referring to Figures 7 to 10, inclusive, of the drawings, the clutch mechanism disclosed in Figures 1 to 6 of the drawings is shown having a modified centrifugal mechanism associated therewith. Accordingly, like parts have been given the same reference characters, and they will not again be described. Centrifugal weights 101, of substantial size, are disposed at 120° intervals about the flywheel, between weights 102, which are similarly spaced, and are of smaller size or mass. Weights 101 are similar to weights 34 previously described, with the exception that each of them is provided with a head having a single knife edge 43, and it is located on the inner edge thereof, and the heads of weights 102 have a single knife edge 43, located on the outer edge thereof. Weights 101 are designed to withdraw the automatic plate from driving engagement with the driven member when the engine accelerates to idling speed, and they will therefore be termed disengaging weights. Weights 102 do not come into play to exert driving pressure on the automatic plate until speeds substantially above idling speed are attained, and they therefore will be termed driving weights.

Weights 101 and 102 are urged toward the axis of rotation of the mechanism by means of spring units. Each unit comprises a plunger 104, adapted to slide in a recess 105 formed in the flywheel rim. Cooperating with plunger 104 is a retainer member 106 which fits around the plunger and guides it in its movement. Seated on retainer member 106 is a compression spring 107, the other end of which bears against a threaded plug 108, which is threaded into recess 105. In this form of the invention the same general functions are accomplished as those effected in the previously described mechanism, but they are attained in a slightly different manner. Automatic disengagement of the clutch plates when the flywheel is accelerated to idling speeds is effected by one set of weights, and engagement of the clutch under driving conditions when the engine is operating at speeds substantially above idling speeds is accomplished by a second set of weights.

Referring to Figure 8 of the drawings, the parts are shown in the positions they assume when the flywheel is stationary or operating at speeds substantially below idling speed. Weights 101, under the influence of their spring units have been moved inwardly about their knife edges 43 as fulcrums, and they are held in this position by stops 109 provided thereon which abut the flywheel web. Automatic plate 22 is disposed in frictional engagement with the driven member, and a direct drive is accordingly established between the driving shaft and the driven shaft. Declutching may be effected when the parts are in this position because stops 109 are designed to prevent the spring units associated with weights 101 from forcing them further inwardly than the positions in which they are shown. They are therefore prevented from producing further movement of automatic plate 22.

Weights 102 at this time are disposed in their innermost positions with their stops 111 in engagement with the flywheel web and they are held in this position by the action of their spring units. It is observed that the flat faces of the heads 38 of weights 102 are spaced from the automatic plate, due to the fact that weights 101 have moved the automatic plate away from them. Weights 102, however, are firmly held in this position against displacement through the three point contact shown in Figure 8, and are restrained against rotational movement through engagement of their heads 38 with ribs 40 formed on the automatic plate.

When the flywheel is accelerated to idling speed, the parts will take the positions that they are seen to assume in Figure 9. During this acceleration to idling speed, weights 101, due to their substantially greater mass than weights 102, swing outwardly against the restraining or retarding action of their hold-back spring units and seat against the flywheel rim and are held in this position as long as idling speed is maintained. As this occurs, idle release springs 29 retract the automatic plate into disengaged position. During this operation weights 102 do not move from their initial position shown in Figure 8, due to the fact that they are of less mass than weights 101 and accordingly are effectively restrained against outward movement by their spring units. The spring units for both sets of weights are therefore designed to be of substantially equal capacity. In this connection it is to be understood that in the event that the retarding effect of the spring units for weights 101 or 102 do not properly effect the results desired, the pressure of the springs employed in the spring units may be varied to produce any desired weight operation. If desired, weights 101 and 102 may be made of equal mass, and the strength of the respective spring units varied to produce sequential operation of the weights in response to rotation of the flywheel, and this structure is to be understood to be embraced by the present disclosure. For instance, different types of prime movers have different idling speeds, and it is necessary to adjust the resistance of the spring units so that disengagement of the plates will be secured when the idling speed of the particular prime mover involved is reached.

Under the conditions illustrated in Figure 9, no torque transmitting connection exists between the driving and driven shafts and the parts when in this condition are stable. Weights 101 are seated firmly against the flywheel rim, and hence are restrained from further movement in response to centrifugal force, and weights 102 are held in the positions shown by their spring units.

When the flywheel is accelerated to speeds substantially above idling speed, driving weights 102 swing outwardly about their knife edges 43 as a pivot in response to centrifugal force. Pivots 43 of weights 102, in combination with their faces 42 reacting against the flywheel web, gradually and smoothly move the automatic plate into engagement with the driven member, and pressure is built up in springs 62 and 63, producing staging of clutch engagement in the manner described in connection with the clutch mechanism disclosed in Figure 1. When the second stage of clutch engagement is complete, there is no slippage between the driving and driven plates and the parts assume the positions in which they are shown in Figure 10 of the drawings, with weights 102 in their extreme outward position in contact with the flywheel rim.

During this latter operation, weights 101 have remained in contact with the flywheel rim and accordingly a clearance now exists between the heads 38 thereof, and the automatic plate. They are maintained in correct assembled relationship under these conditions in the manner described in connection with weights 102 when the flywheel was stationary. When the flywheel is decelerated to idling speed, the plates disengage and upon further deceleration of the flywheel, to speeds substantially below idling speed, the plates are re-engaged.

This mechanism therefore produces engagement of the clutch plates when the flywheel is stationary or operating at a speed substantially below idling speeds, automatically disengages the plates when the flywheel attains substantially idling speed, and restores the plates to engaged condition when the flywheel is accelerated substantially above idling speed. Declutching of this mechanism may also be effected by operating the clutch pedal in the manner described in connection with the mechanism shown in Figure 1.

In Figures 11 to 16 of the drawings, I have disclosed the same general power transmitting mechanism of Figure 1 provided with a further modified centrifugal mechanism. With continued reference to these figures, centrifugal weight levers 36 are provided with heads similar to those disclosed in Figure 1. Mounted upon the outer face of each lever 36 is a weight 121 which is secured thereto by a pair of shouldered bolts 122 threaded into weights 121. Weights 121 are provided with an inclined face 123, adapted to cooperate with the flywheel rim when in its outer position and also with a plunger 124 slidably mounted in a bore 125 formed in the flywheel rim. Plunger 124 is associated with a guiding member 126, which forms a seat for a primary holdback spring 127. Spring 127 urges plunger 124 inwardly against face 123 of weight 121. The outer end of spring 127 bears against a plug 128 which is threaded into bore 125. Idle release springs 29 and the declutching mechanism are not shown, but are also used in this form of my invention.

A second weight 131 is associated with each lever 36, and is U-shaped in cross-section. Each weight 131 is provided with a pair of apertures 132, which are slidably associated with studs 122. Bolts 122 are encircled by secondary holdback springs 133, which urge the central portion of weight 131 against the inner face of lever 36. Springs 134 are disposed in bores 135 in weights 131 and bear against the shanks of bolts 122. In view of the fact that apertures 132 are relatively large for the purpose of allowing bolts 122 to rock, as well as slide therein, springs 134 perform the function of eliminating unnecessary play between these parts, and for yieldingly resisting the rocking movements thereof. Weights 131 are further provided with stops 136, which are adapted to contact the flywheel web when the weights are in their innermost position, for the purpose of preventing the plungers 124 from moving the weights inwardly too far as explained in connection with Figure 1.

When the flywheel is rotating at speeds substantially below idling speeds or is stationary, the parts take the positions in which they are shown in Figures 11 and 14, and it is noted that spring plungers 124, acting upon weights 121, urge the weight levers 36 inwardly, causing the inner knife edges 43 to move automatic plate 22 into engagement with the driven member. With the parts in this position, a direct drive exists between the driving and driven shafts.

When the flywheel is accelerated to engine idling speed, weights 121 and 131 move outwardly as a unit, due to the fact that they are both acted upon substantially equally by centrifugal force, and are held in unitary relation by springs 133. When weights 131 contact the flywheel rim, weight levers 36 are disposed in their neutral positions, with the flat faces of the heads thereof in contact with automatic plate 22. Automatic plate 22 is accordingly disengaged from the driven member, and the parts are then in the idle release position shown in Figures 12 and 15 of the drawings. During the operation just described, weights 121 and 131 act together under the influence of rotation and their combined influence is exerted upon levers 36 to bring them into their neutral positions against the action of their primary and secondary hold-back or retarding units.

Therefore, weights 121 and 131 need not be made excessive in size in order to respond to a fairly low speed of rotation.

When the flywheel is accelerated to a speed substantially above idling speed, weights 121 swing about their outer knife edges 43 as a fulcrum, against the action of the primary and secondary hold-back units. This movement of levers 36 causes automatic plate 22 to move into engagement with the driven member against the action of springs 29, and pressure staging of clutch engagement is effected in the manner described in connection with Figure 1. When weights 121 contact the fly-wheel rim, the clutch is fully engaged, and there is no slippage between the clutch plates and the parts are then disposed in the positions shown in Figures 13 and 16.

In the present mechanism, secondary holdback springs 133 assist in effecting pressure staging of clutch engagement. As has been previously pointed out, the plate travel from fully disengaged position to fully engaged position must be limited to a small value, hence staging of clutch engagement must be effected in this rather limited range of movement. In view of the further fact that centrifugal force increases as the square of velocity of rotation, when a substantial speed has been attained the weights if unretarded, would tend to move rapidly out toward their seats against the flywheel rim, with the result that clutch engagement would be relatively rapid, and full driving pressure would be built up in a small range of speed of the flywheel, resulting in possibly grabbing clutch engagement. It has been found in practice, that by inhibiting or retarding movement of the centrifugal weights in response to centrifugal force, the pressure exerted thereby may be caused to build up over a greater range of speed of the flywheel, and that pressure staging can be more readily effected, and a smoother operating mechanism obtained. Therefore, in the present mechanism, when weights 131 are in contact with the flywheel rim, and weights 121 start to move outwardly under the influence of centrifugal force, they are resisted by secondary hold-back springs 133, as well as by primary holdback springs 127. Springs 127 and 133 therefore have a tendency to retard weights 121, thus providing a slow movement of automatic plate 22, so that staging operation of springs 62 and 63 is effected.

When the flywheel is decelerated to idling speed, weight levers 36 move to the position shown in Figures 12 and 15, under the influence of springs 125, 127 and 133, and also idle release springs 29, and the latter cause movement of the automatic plate to disengaged position. When the engine is stopped, weights 121 and 131 move as a unit under the influence of spring plungers 124 into the positions shown in Figures 11 and 14, and clutch engagement is effected. Since each lever 36 performs both the function of giving a positive drive when the engine is stationary and also producing clutch engagement under driving conditions, the pressure exerted thereby is uniformly distributed about the area of the automatic plate, and the use of unusually large weights in this organization is avoided, because under low speed conditions, when a large mass is required to produce the proper centrifugal force, the combined centrifugal force of weights 121 and 131 is employed to bring levers 36 into their neutral positions, and their movement is resisted only by springs 125.

In connection with the above described clutch mechanisms, it is to be understood, that while manual declutching means have been shown for operating the positive plate for declutching purposes, the declutching mechanism may be omitted and stops similar to those in Figure 6A employed to hold positive plate 23 in the position shown in Figure 12 but permitting movement thereof to the right in response to movement of plate 22. A fully automatic clutch is thereby produced, that effects a direct driving connection between the driving and driven shafts when the engine is stationary or is operating at speeds substantially below idling speeds, that automatically disengages the plates when the engine reaches idling speed, and causes clutch engagement and couples the driving and driven shafts when the engine is accelerated to speeds substantially above idling speed.

In Figures 17 to 21 inclusive, I have disclosed an automatic power transmitting mechanism that is similar in some respects to those previously described. Referring to these figures, the mechanism is adapted to be enclosed in a housing similar to that disclosed in Figure 1, but it has been omitted so as to simplify the disclosure.

Many parts are identical in structure and function to those shown in Figure 1, and these parts are given like reference characters, and will not be again described.

Each weight lever 36 is provided with a head 38 that has a single knife edge or fulcrum 43 formed in its outer edge. Weights 34 are designed to be held in the positions shown in Figure 18 under the influence of springs 29, when the flywheel is rotating at idling speed, or is stationary, and to actuate automatic plate 22 to clamp driven member 17 between it and the positive plate and cause pressure to be built up in springs 62 and 63 in the manner described in connection with the mechanism shown in Figure 1, when the flywheel is accelerated to speeds substantially above idling speed. The weights in the present instance, however, do not move inwardly beyond the neutral positions in which they are shown in Figure 18 to cause engagement of the clutch plates when the flywheel is stationary, but this result is effected by automatically actuating the positive plate in the manner to be presently described. In view of the fact that no hold-back units are associated with weights 34 in this form of the invention, springs 29 are made stronger and cooperate with weight heads 38 and function as hold-back springs, in addition to effecting idle release condition of the automatic plate.

Secured to rim 151 of flywheel 8 by means of threads 152 is an annular housing member 153 having a flange 156. Member 153 is adjustably secured against rotation with respect to flywheel 8 by a cap screw 154 extending through an aperture in the flywheel rim and threaded into one of a plurality of apertures 155 located in member 153. Secured to flange 156, by means of cap screws 157, is a complemental housing member 158 which cooperates with member 153 to house the mechanism. The internal wall of member 153 is provided with a plurality of bosses 159, into which square-end studs 161 are threaded. Each stud 161 seats in a recess 162 formed in the periphery of positive plate 23, and they cause the positive plate to be driven by the flywheel.

Springs 62 and 63 seat in sockets formed in positive plate 23' and their other ends are received in retainers 164, secured to member 158 in any suitable manner, and are designed to produce pressure staging of clutch engagement in the manner described in connection with Figure 1, when automatic plate 22 is actuated by weights 34.

A plurality of centrifugal weights 165, preferably of substantially greater mass than weights 34, are disposed in the housing formed by members 153 and 158, and are provided with knife-edge fulcrums 166 which cooperate with angular seats 167 formed in the inner wall of member 153 and are located between bosses 159. Each weight 165 is further provided with a head 169 having a fulcrum face 171 formed thereon. Heads 169 seat in angular recesses 172 provided in plate 23'. Each recess 172 is provided with a reaction face 173, with which face 171 of weight head 169 cooperates. Each weight 165 has an angular extremity providing faces 174, 175 and 176. Faces 174, 175, and 176 are adapted to cooperate with the inner wall of members 158 and 153 respectively during certain phases of operation of the weights as pointed out hereinafter.

Referring now to Figure 17, the parts are shown in the positions they assume when the flywheel is rotating at a speed substantially below idling speed or is stationary. Weights 34 are disposed in their inner or neutral positions and are retained in this condition by virtue of the retracted position in which the automatic plate is held by hold-back springs 29. Driven member 17 is nevertheless clamped between the automatic and positive plates under the influence of springs 62 and a driving connection is thereby established between the driving and driven shafts. Although springs 63 are not effective under these conditions and do not exert pressure on the positive plate, the torque requirements are small, and the driving and driven members are usually stationary when a drive of this type is utilized, and therefore the pressure exerted upon the positive plate by springs 62 is adequate to couple shafts 5 and 11.

When the flywheel is accelerated to idling speed, weights 165 pivot about their fulcrums 166 and react against faces 173 formed on positive plate 23' to cause the positive plate to be moved into the position shown in Figure 18, thus disengaging member 17 from the automatic and positive plates and disconnecting the driving and driven shafts. Under these conditions, weights 165 are disposed as shown in Figure 18 with their faces 172 and 176 in contact with members 158 and 153 respectively. Weights 165 are therefore held against further outward movement or movement axially of the mechanism under these conditions.

During acceleration of the flywheel to idling speed, weights 34 have remained in their neutral positions because they are of smaller mass than weights 165, and therefore are less responsive to centrifugal force. It is to be understood, however, that weights 34 and 165 may be made of substantially equal size, and hold-back springs 29 suitably designed to inhibit the action of weights 34 when the flywheel is rotating at idling speed. If desired, retarding units of the type disclosed in Figure 1 may also be employed to exert a further retarding influence upon weights 34.

When the flywheel is accelerated to a speed substantially above idling speed, weights 34 pivot outwardly about their fulcrums 43 and react against the flywheel web and cause actuation of the automatic plate and pressure staging of clutch engagement in the manner described in connection with Figure 1. The driving and driven shafts are thereby coupled, and the final, fully engaged condition is shown in Figure 19. Weights 165 have not moved from the positions that they took in Figure 18, when the flywheel was rotating at idling speed, but movement of the automatic plate has caused the positive plate to be moved out of contact with the heads 169 of weights 165. The weights are securely held against displacement under these conditions by engagement of their stop faces with members 153 and 158 as previously explained. When the flywheel is decelerated to idling speed, weights 34 move inwardly and disengage the clutch plates as seen in Figure 18, and upon deceleration of the flywheel to a speed substantially below idling speed, the centrifugal force exerted by weights 165 diminishes to a small value and is overcome by springs 62, which actuate the positive plate to clamp driven member 17 between it and the automatic plate.

When facings 19 become thin as the result of wear, screw 154 may be removed and housing members 153 and 158 rotated as a unit with respect to flywheel rim 151, to cause the driven member to be clamped between the automatic and positive plates with the proper engaging pressure. Screw 154 is then replaced in the proper aligning apertures in member 153 and flywheel rim 151 to lock the parts in adjusted relationship.

Although the present mechanism is fully automatic and is solely responsive to variations in the speed of the flywheel, it is to be understood that positive plate 23' may be provided with the manual declutching mechanism disclosed in Figure 1 for disengaging the clutch plates during any phase of operation. In this connection, referring to Figures 17 and 19, it should be particularly observed that the clearance between the body and head of weight 165 is sufficient to allow declutching movement of positive plate 23' whether it is disposed in engaged position when the flywheel is stationary or is rotating at a speed substantially above idling speed.

Ventilation of this clutch mechanism is effected in the same manner as those previously described, the heated, dust-laden air in this being exhausted from the mechanism through apertures 181 in the flywheel rim and apertures 282 suitably spaced around the periphery of member 253.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power transmitting mechanism comprising, a driving member; a driven member; a plurality of movable elements designed to cause engagement of said driving and driven members when they are disposed either side of a neutral position; means for automatically causing said elements to move to one side of said neutral position when said driving member is rotating substantially below a predetermined speed, and means associated with said elements for automatically causing said elements to move to the other side of said neutral position when said driving member is accelerated to a speed substantially above said predetermined speed.

2. The power transmitting mechanism set forth in claim 1 wherein said first named means comprises spring means acting upon said elements.

3. The power transmitting mechanism set forth in claim 1 wherein said second named means comprises speed-responsive means associated with said elements.

4. The power transmitting mechanism set forth in claim 1 wherein said last named means comprises centrifugal weights secured to said elements.

5. A power transmitting mechanism comprising, an automatic plate; a driven member; a reaction member, means, adapted to react against said reaction member, for automatically causing said automatic plate to move away from said reaction member and frictionally engage said driven member when said automatic plate is decelerated to a speed substantially below a predetermined speed, or accelerated to a speed substantially above said predetermined speed.

6. An automatic power transmitting mechanism comprising, a positive plate; a driven member; an automatic plate having speed responsive means for causing it to engage said driven member; and centrifugally operable means for causing said positive plate to frictionally engage said driven member when said positive plate is decelerated to a speed substantially below a predetermined speed, and for causing said positive plate to be disengaged from said driven member when said positive plate is accelerated to said predetermined speed.

7. The automatic power transmitting mechanism set forth in claim 6 wherein said means comprises a plurality of fulcruming weight elements associated with said positive plate.

8. An automatic power transmitting mechanism comprising a driving member; a driven member; spring means operably associated with said mechanism; means for forcing said driving and driven members into frictional engagement against the action of said spring means when said driving member is accelerated to a speed substantially above a predetermined speed; means for manually disengaging said driving and driven members against the action of said spring means, and means associated with said driving member for automatically re-engaging said members against the action of said spring means and for establishing a coupling between said members having a torque capacity which is independent of the magnitude of the torque transmitted between said members when said driving member is decelerated to a speed substantially below said predetermined speed, and said manually disengaging means is inactive.

9. In a clutch, driving and driven members mounted for engagement and disengagement; means for causing said members to manifest a tendency to disengage; means for automatically bringing said members into engagement when said driving member is rotated at speeds substantially lower than a predetermined idling speed, said means being operable to automatically engage said members when the driving member is rotated at speeds substantially in excess of said idling speed, said last-named means being solely responsive to speed, at least when it engages said members at speeds in excess of said idling speed.

10. The structure set forth in claim 9, wherein said engaging means includes a centrifugally operable device for forcing said members into engagement when said driving member is rotated at speeds in excess of idling speed.

11. In a clutch, driving and driven members mounted for engagement and disengagement; means tending to disengage said members; means for automatically engaging said members against the action of said disengaging means when said driving means is rotated at speeds substantially greater than a predetermined idling speed; and centrifugally controlled means for automatically engaging said members against the action of said disengaging means and for establishing a substantially constant torque capacity coupling between said driving and driven members when said driving member is rotated at speeds substantially less than idling speed or is at rest.

12. The device described in claim 11, wherein said disengaging means comprises resilient means adapted to normally urge said members apart.

13. The device described in claim 11, wherein said first named engaging means comprises a centrifugally operable mechanism.

14. The device described in claim 11, wherein said second named engaging means comprises part of said first named engaging means.

15. The device described in claim 11, wherein said second named engaging means comprises resilient means adapted to act upon parts of said first named engaging means.

16. In a clutch, driving and driven members mounted for engagement and disengagement, resilient means acting upon said members and tending to maintain them disengaged, means including centrifugally operable means for automatically engaging said members against the action of said resilient means when said driving member is rotated at speeds substantially below a predetermined idling speed or is at rest, and for automatically allowing said resilient means to disengage said members when said driving member is rotated at idling speed, and a second centrifugally operable means for automatically engaging said members when said driving member is rotated at speeds substantially greater than idling speed.

17. In a clutch, driving and driven members mounted for engagement and disengagement; means for causing said members to engage whenever said driving member is rotated at speeds substantially greater or less than a predetermined idling speed; comprising a plurality of speed-responsive elements operably associated with said members, and operable to contact and apply engaging forces to said driving member.

18. In a clutch, a driving and driven clutch plate assembly adapted to transmit power between a driving shaft and a driven shaft, said driving and driven clutch plate assembly embodying axially movable members having axially facing friction surfaces adapted to be brought into frictional engagement, means for causing said members to engage whenever said driving shaft is rotated at speeds substantially greater or less than a predetermined idling speed, comprising a plurality of speed-responsive elements automatically operable in sequence to directly apply axially directed forces to said driving and driven clutch plate assembly when said driving shaft is rotated through a predetermined speed range, for causing pressure to be built up between the friction surfaces of said members.

19. The device described in claim 18, wherein said speed-responsive elements are arranged in groups and means are associated with at least one of the groups for opposing its action.

20. The device described in claim 18, wherein said speed-responsive elements are disposed in groups, the elements of one group being operable to apply forces to said members when they are disposed in different attitudes from that of the other group, and wherein means are associated with certain of said elements for causing the groups to operate in sequence when said driving member is rotated through a predetermined speed range.

21. In a clutch, driving and driven members mounted for engagement and disengagement; a plurality of movable elements operable to engage said members when they are disposed either side of a neutral position; and means for automatically applying at least two sets of operating forces to said elements when said driving member is accelerated through a predetermined speed range, one of said sets of forces being inoperative to act upon said members during a part of said predetermined speed range.

22. The device described in claim 21, wherein said last named means comprises sets of centrifugally operable members operably connected to said elements, at least one set of which becomes inoperative to apply forces to said elements after the latter attain neutral position in response to rotation of said driving member through a predetermined speed range of said driving member.

23. The device described in claim 21, wherein said last named means comprises primary and secondary weights which are connected to said elements in such manner as to exert their combined centrifugal forces to said elements only when said elements are moving from one side of said neutral position toward neutral position.

24. The device described in claim 21, together with resilient means for opposing movement of said elements in response to acceleration of said driving member and operable to move said elements to one side of neutral position when said driving member is stopped.

25. In an automatic clutch, in sub-combination, a pair of members mounted for synchronous rotation and for relative axial movement, a movable element operably associated with said members and operable to cause separation of said members when it is moved into either of two actuating positions located either side of a neutral position; means including at least two speed-responsive devices for moving said element from one of said actuating positions into neutral position when said members are accelerated from substantially at rest condition to a predetermined idling speed; and for moving said element from neutral position into said other actuating position when said members are accelerated to a speed substantially in excess of idling speed; and means for causing at least one of said speed-responsive devices to become inoperative when said element attains neutral position.

26. The device described in claim 25, wherein said speed-responsive devices comprise at least two centrifugally operable weights adapted to apply forces to said element, one of said weights being connected to said element by lost motion means and having a stop means for arresting its movement after said element has attained neutral position under its influence.

27. The device described in claim 25, together with means tending to urge said element into one actuating position against the action of said speed-responsive devices.

28. In a clutch, driving and driven members mounted for engagement and disengagement, resilient means acting upon said members and tending to bring them into engagement, centrifugally operable means for automatically disengaging said members against the action of said resilient means when said driving member is rotated at a predetermined idling speed, and for automatically allowing said resilient means to bring said members into engagement when said driving member is rotated at speeds substantially below said idling speed or is at rest, and centrifugally operable means for automatically engaging said members and building up pressure in said resilient means when said driving member is rotated at speeds substantially in excess of said idling speed.

29. A power transmitting mechanism comprising, a driving member; a driven member; means for causing said members to be disengaged when said driving member is accelerated from speeds substantially below a predetermined speed, to said predetermined speed, comprising a set of centrifugally operable elements; and means for causing said members to be automatically re-engaged when said driving member is accelerated to speeds substantially above said predetermined speed, comprising a second set of centrifugally operable elements, both of said sets of elements being operable to contact and apply engaging forces to said driving member.

30. The power transmitting mechanism set forth in claim 29, wherein resilient means are associated with said second set of centrifugally operable elements for inhibiting the action thereof until said driving member is accelerated to a speed substantially above said predetermined speed.

31. In an automatic clutch, a driven member; a driving plate mounted for movement toward and away from said driven member; and centrifugally operable means for causing said driving plate to move into engagement with said driven member and to build up pressure therebetween when said driving plate is rotated at speeds substantially above or below a predetermined idling speed, the magnitude of the pressure built up between said plate and said driven member under the influence of said centrifugally operable means being independent of the magnitude of the torque transmitted between said plate and said driven member.

32. In a clutch, driving and driven members mounted for engagement and disengagement, means for causing said members to manifest a tendency to disengage, means for automatically bringing said members into engagement when said driving member is rotated at speeds substantially lower than a predetermined idling speed, said last named means being operable to directly apply axially directed forces to, and automatically engage said members against the action of said first-named means when the driving member is rotated at speeds substantially in excess of said idling speed, said engaging means including a centrifugally operable device for forcing said members into engagement when said driving member is rotated at speeds in excess of idling speed.

WILLIAM E. HAUPT.